Figure 1:
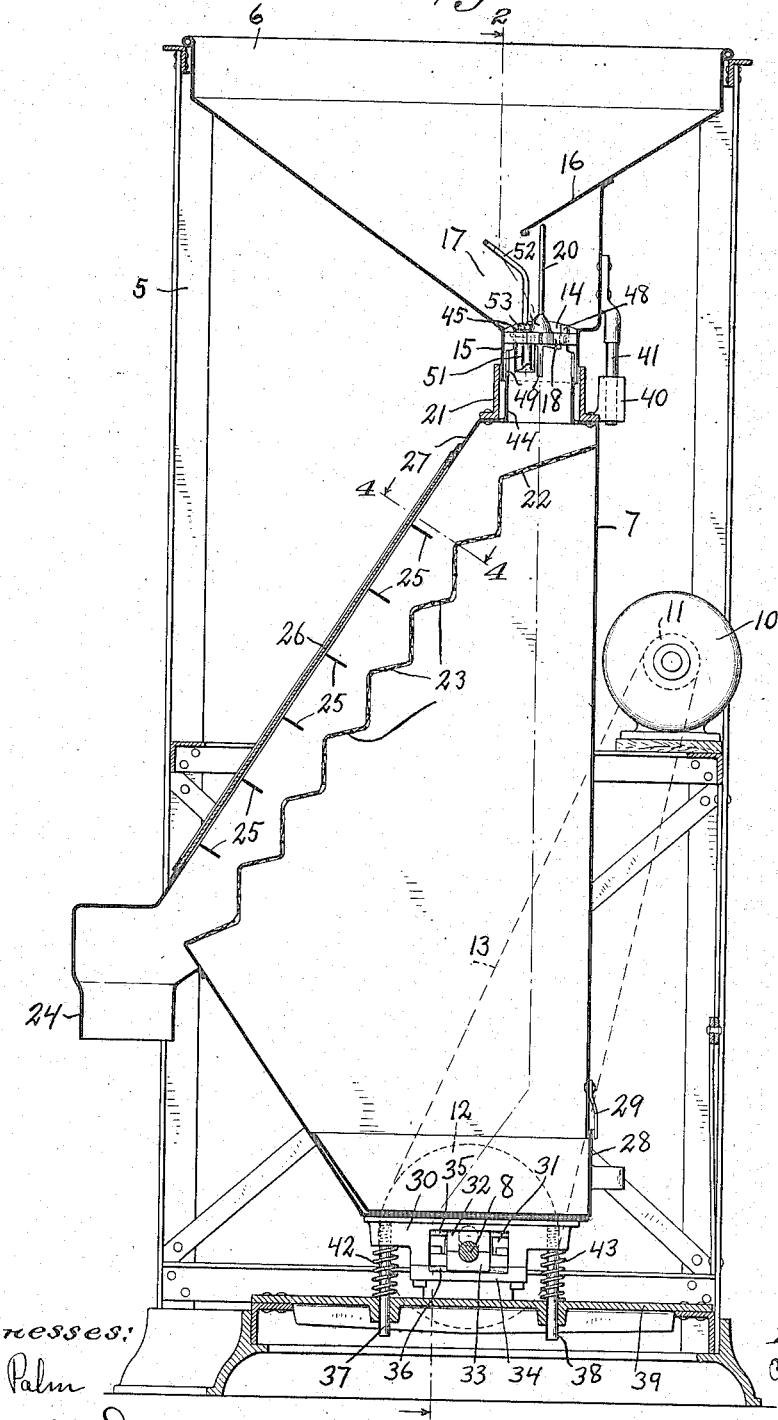

C. H. KREBS.
CLEANING MACHINE.
APPLICATION FILED APR. 24, 1914.

1,129,875.

Patented Mar. 2, 1915.
2 SHEETS—SHEET 1.

Witnesses:
Fred Palm
Frank E. Dennett

Inventor:
Charles H. Krebs
By Flanders Bottum Fawsett & Bottum
Attorneys.

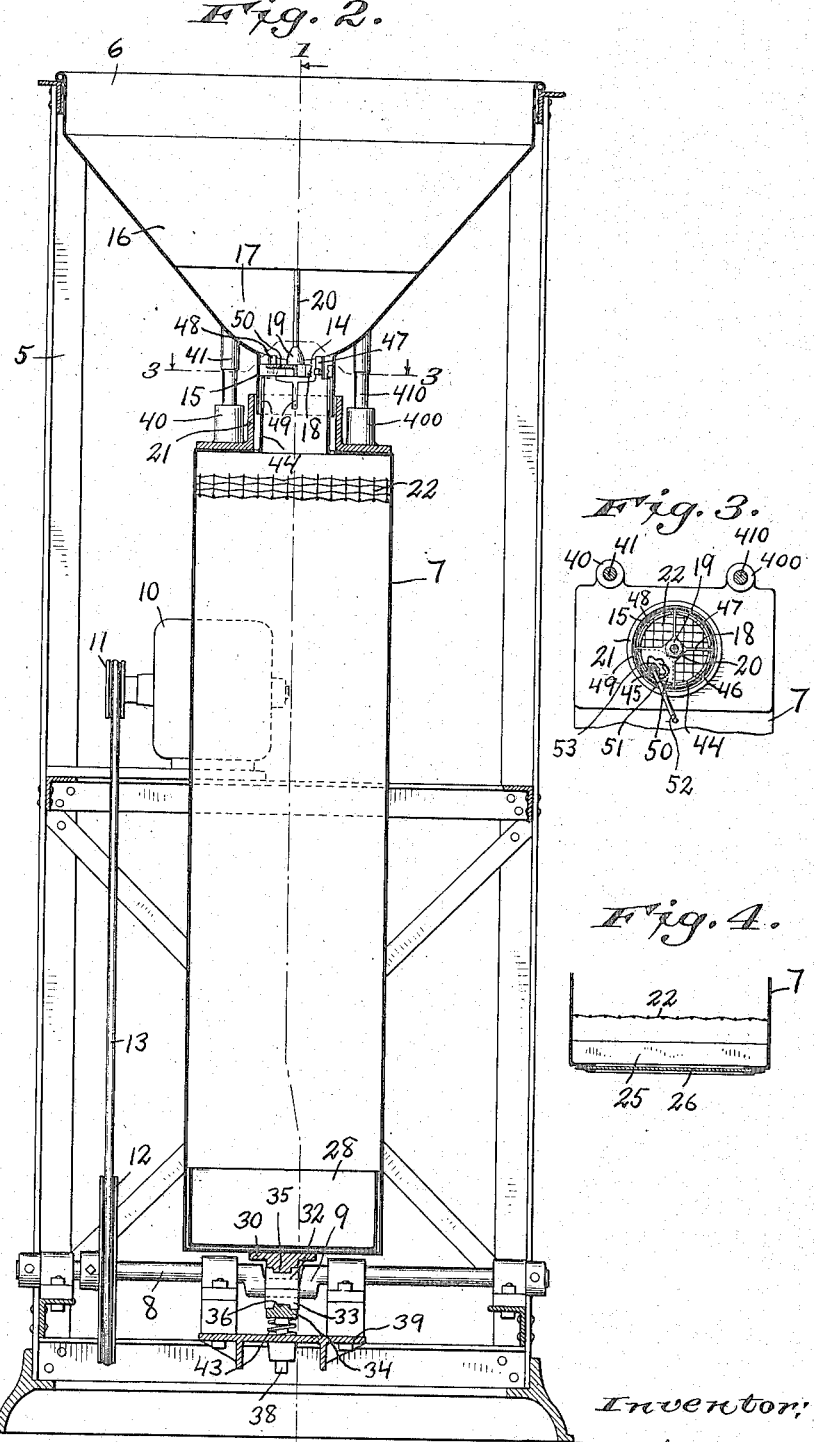

UNITED STATES PATENT OFFICE.

CHARLES H. KREBS, OF MILWAUKEE, WISCONSIN.

CLEANING-MACHINE.

1,129,875.          Specification of Letters Patent.      Patented Mar. 2, 1915.

Application filed April 24, 1914. Serial No. 834,057.

*To all whom it may concern:*

Be it known that I, CHARLES H. KREBS, a citizen of the United States, residing at Milwaukee, in the county of Milwaukee and State of Wisconsin, have invented certain new and useful Improvements in Cleaning-Machines, of which the following is a specification, reference being had to the accompanying drawing, forming a part thereof.

This invention relates to cleaning machines and the objects of the invention are to provide a cleaning machine adapted to clean crown corks (a well known kind of bottle stoppers) and other articles of a size adapted to be handled by the machine.

Referring to the drawings which accompany this specification and form a part hereof, on which drawings the same reference characters are used to designate the same elements wherever they may appear in each of the several views, and which drawings illustrate an embodiment of this invention, Figure 1 is a vertical, longitudinal section of the machine taken on the line 1—1 on Fig. 2, looking in the direction indicated by the arrows; Fig. 2 is a vertical, transverse section of the machine taken on the line 2—2 on Fig. 1, looking in the direction indicated by the arrows; Fig. 3 is a section taken on the line 3—3 on Fig. 2, looking in the direction indicated by the arrows; and Fig. 4 is a section taken on the line 4—4 on Fig. 1, looking in the direction indicated by the arrows.

Referring to the drawings, the reference numeral 5 designates a frame for supporting the mechanism, 6 a hopper supported by the frame, 7 a screen box, and 8 a shaft provided with eccentric, shaking mechanism, illustrated as a crank 9 for shaking the screen box 7. The shaft 8 can be rotated by hand or by power, and the drawings illustrate an electric motor 10 for rotating the shaft by means of the pulleys 11 and 12 and the belt 13.

The hopper 6 terminates in a feed opening 14 in a projection 15 and the bottom of the hopper slopes down to this opening on three sides, so to speak, so that the corks will slide down to the opening in a manner which will be readily understood. An inclined plate 16 forms a part of the bottom of the hopper and projects over the feed opening 14, leaving a feed throat 17 through which the corks must pass to reach the feed opening 14. This arrangement prevents the corks from collecting under the inclined plate 16 over the feed opening 14 in any considerable quantity as the inclined plate 16 acts as a guard or shield for the feed opening 14. A spider 18 is secured in the projection 15 in the feed opening 14 and serves to prevent the corks from flowing through said opening in a continuous stream. The spider is provided with a tapered hub 19 and a spindle 20 for a purpose to be hereinafter described.

The screen box 7 is provided with a collar 21 which encircles the projection 15 of the hopper 6, and with a screen or sieve 22 which is preferably slightly inclined downwardly immediately under the feed opening 14 and then descends in an incline by a series of steps 23 to the outlet 24. The top 27 of the screen box is spaced from the screen 22 but is inclined downwardly in a direction generally parallel therewith and is provided with baffles 25 located approximately opposite the "treads" of the steps 23. A glass cover 26 may be provided in the top 27 of the screen box through which the corks can be observed, if desired. A removable dirt receptacle 28 may be placed in the bottom of the screen box and held in place by a catch 29. A bracket 30 is secured to the bottom of the screen box in which is a rectangular opening 31 for the crank slides 32 and 33 which are held in place by the bar 34 and the ribs 35 and 36. The screen box is held in vertical alinement by the pins 37 and 38, secured to bracket 30 and slidable in bores in the base plate 39 secured to the frame 5, and lugs 40 and 400 formed on the collar 21 and which are bored to slide on the rods 41 and 410 which are secured to the hopper 6. Springs 42 and 43 cushion the downward movements of the screen box.

Agitating mechanism for causing the corks to feed from the hopper into the screen box is provided as follows: An extension 44 projects from the screen box up inside the projection 15 and is provided with prongs which extend through the spaces between the bars of the spider 18. These prongs are designated by the reference numerals 45, 46, 47 and 48 and it is preferred to have at least one prong between each two bars of the spider. The top of the extension 44 is preferably provided with slots 49 to receive the bars of the spider as the screen box and extension 44 are elevated or raised, while they are being vibrated or reciprocated, so that the upper end of the extension 44 rises above the spider and also agitates the corks.

If small sized corks are being cleansed and they feed too rapidly into the screen box so that there is danger of their jamming and not being free enough to be thrown about by the screen 22, one or more of the openings between the bars of the spider 18 can be closed so as to reduce the rapidity of the feed. The spider may be secured in place by solder, or in any other suitable and convenient manner, and can be readily removed and replaced, and, preferably, when it is desired to reduce the rate of feed, a spider is inserted which has one or more of the apertures between its bars permanently closed by a plate 50. To prevent the corks from piling and packing above plate 50, an agitator 51 with an inclined or sloping top is fastened adjacent the prong alined with the aperture closed by plate 50 and the plate 50 is apertured for the reception of the prong and the agitator.

I find in actual practice that a stirrer 52, or agitator, in the feed throat 17 and the bottom of the hopper greatly facilitates the feeding of the corks and undermines them so that all tendency to pack is avoided. I form this stirrer 52 from a heavy wire screwed into a screwthreaded opening or bore in the top of the agitator 51 and hold it securely in place by a lock nut 53, for example. The stirrer 52 is preferably extended straight upwardly at first and then bent parallel with the sloping bottom of the hopper 6 as clearly shown by Fig. 1 of the drawings. I also find it of advantage to locate the agitator 51 to one side of the central plane of the machine and incline the bent end of the stirrer 52 toward the central plane of the machine as clearly shown by Fig. 3 of the drawings.

The operation of the machine is as follows: The crown corks, for example, are fed to the hopper 6 continuously or are supplied thereto whenever necessary and some of them will slide immediately down the inclined or sloping bottom, through the feed throat 17 to the spider 18, and some may pass down through the spider into the screen box onto the screen therein. The normal tendency, however, will be for them to pack above the spider. The motor 10 being started, the screen box will be vibrated or reciprocated up and down, the prongs, the upper end of the extension 44, the agitator 51 and the stirrer 52 will be thrust up among the corks, thereby loosening them and breaking up the packed mass so that the corks will be free to slip and slide and fall through the openings between the bars of the spider. The stirrer 52 acts to undermine the mass by lifting the upper part of the mass thereby leaving the corks below it free to slide down the inclined or sloping bottom of the hopper. The bent part of the stirrer 52 being parallel with the bottom of the hopper prevents the corks from being caught or jammed between it and the bottom of the hopper. The spindle 20 serves as a stop to divide and spread the stream of corks flowing through the feed throat 17 and the tapered hub 19 catches the edges of the corks as they descend and tilts them so that they will fall edgewise through the openings between the bars of the spider. The "treads" of the steps 23 of the screen 22 are slightly inclined downwardly, and, after the corks are in the screen box on the screen, they will be thrown up and, in falling, will fall farther down the inclined screen. The baffles 25 will prevent the corks from jumping the whole length of the screen and will practically compel them to descend the screen a step at a time until they are delivered through the outlet. The bumps which the corks receive against the screen, the baffles and the top of the screen box effectually shake loose all the dirt, bits of cork, pieces of tin, etc., which fall through the screen and collect in the removable dirt receptacle 28.

What is claimed is:

1. In a cleaning machine, the combination of a screen box provided with a downwardly inclined, stepped screen therein, a top spaced from the screen and inclined downwardly, and baffles located adjacent the top, and means for vibrating the screen box up and down.

2. The combination with a hopper provided with a feed outlet and a spider therein, of a vibratable screen box provided with prongs adapted to be reciprocated between the bars of the spider.

3. The combination with a hopper provided with a feed outlet and a spider therein, of a vibratable screen box provided with a slotted extension carrying prongs, and means to reciprocate the upper end of the extension and the prongs above the spider.

4. In a cleaning machine, the combination with a vibratable screen box of a hopper located above the same and having an inclined bottom with a feed opening therein, a spider located in said feed opening, and a plate inclined toward the bottom of the hopper from the opposite side thereof and projecting over said feed opening and terminating short of the bottom of the hopper to leave a feed throat between the inclined plate and the bottom of the hopper.

5. In a cleaning machine, the combination with a hopper provided with a feed opening, of a spider located in said opening and provided with a spindle and a tapered hub, a vibratable screen box and prongs carried thereby adapted to be reciprocated between the bars of the spider.

6. In a cleaning machine, the combination with a hopper having a downwardly inclined bottom and provided with a feed opening leading therefrom, of a stirrer extending upwardly through said feed opening and having its upper part inclined over the inclined bottom of the hopper and substantially parallel with said inclined bottom, and means to vibrate the stirrer up and down.

7. In a cleaning machine, the combination with a hopper provided with a feed opening, of a spider located in said opening and having a space between its bars closed by a plate which is apertured for a prong and an agitator, a screen box, prongs, an agitator and a stirrer carrier by said screen box, and means for vibrating the screen box up and down.

In witness whereof I hereto affix my signature in presence of two witnesses.

CHARLES H. KREBS.

Witnesses:
 CHAS. L. GOSS,
 FRANK E. DENNETT.